(12) United States Patent
Banal et al.

(10) Patent No.: US 9,474,415 B2
(45) Date of Patent: Oct. 25, 2016

(54) FIRE PIT TABLE WITH LAZY SUSAN TABLETOP PORTION

(71) Applicant: Sunjoy Industries Group Ltd., Steubenville, OH (US)

(72) Inventors: Sean Michael Banal, Galena, OH (US); Lianzhang Pan, Huzhou (CN)

(73) Assignee: Sunjoy Industries Group Ltd., Steubenville, OH (US)

( * ) Notice: Subject to any disclaimer, the term of this patent is extended or adjusted under 35 U.S.C. 154(b) by 9 days.

(21) Appl. No.: 14/572,585

(22) Filed: Dec. 16, 2014

(65) Prior Publication Data

US 2016/0166109 A1 Jun. 16, 2016

(51) Int. Cl.
*A47B 57/00* (2006.01)
*A47J 37/07* (2006.01)
*A47B 13/08* (2006.01)

(52) U.S. Cl.
CPC .......... *A47J 37/0781* (2013.01); *A47B 13/081* (2013.01); *A47B 13/088* (2013.01)

(58) Field of Classification Search
CPC . A47J 37/0731; A47J 37/0781; A47B 11/00; A47B 2200/02
USPC ........................ 108/50.13, 94, 103, 104, 139; 126/25 AA
See application file for complete search history.

(56) References Cited

U.S. PATENT DOCUMENTS

| | | |
|---|---|---|
| 48,888 A | 7/1865 | Atwater |
| 316,979 A | 5/1885 | Knoeller |
| 490,286 A | 1/1893 | Hollowell |
| 505,602 A | 9/1893 | Jackson |

(Continued)

FOREIGN PATENT DOCUMENTS

| | | |
|---|---|---|
| CN | 2129093 Y | 4/1993 |
| CN | 1245668 A | 3/2000 |

(Continued)

OTHER PUBLICATIONS

Outdoor Firepits, Fireplaces, and Chimineas, SunjoyDirect Website, Web page <http://www.sunjoydirect.com/Firepits/Firepits_page_1.html>, 1 page, dated Aug. 29, 2011, retrieved from Internet Archive Wayback Machine <https://web.archive.org/web/20110829055649/http://www.sunjoydirect.com/Firepits/Firepits_page_1.html> on Dec. 3, 2015.

*Primary Examiner* — Matthew Ing
(74) *Attorney, Agent, or Firm* — The Law Office of Patrick F. O'Reilly, III, LLC

(57) ABSTRACT

A fire pit table with a rotatable tray assembly is described herein. The fire pit table includes a base portion including a burner assembly and a storage compartment configured to hold a gas supply cylinder; a tabletop portion supported on the base portion, the tabletop portion having a central aperture disposed therethrough that is circumscribed by an annular ledge portion of the tabletop portion; and a rotatable tray assembly configured to cover the central aperture of the tabletop portion. The rotatable tray assembly includes a base portion configured to be disposed on the annular ledge portion of the tabletop portion, a tray support structure, the tray support structure coupled to the base portion of the rotatable tray assembly; and a tray top member supported by the tray support structure, the tray top member is configured to rotate relative to the tabletop portion of the fire pit table.

20 Claims, 12 Drawing Sheets

Detail "A"

(56) References Cited

U.S. PATENT DOCUMENTS

| | | |
|---|---|---|
| 556,566 A | 3/1896 | Stevens |
| 732,227 A | 6/1903 | Shafer et al. |
| 1,221,646 A | 4/1917 | Zimmerman, Jr. |
| 1,798,634 A * | 3/1931 | Schafer ............... F16C 19/163 |
| | | 108/139 |
| 2,079,225 A | 5/1937 | Sabaneeff |
| 2,453,443 A | 11/1948 | Logan |
| 2,604,884 A | 7/1952 | Walker |
| 2,680,660 A | 6/1954 | Stephens |
| 2,730,416 A | 1/1956 | Williams |
| 3,013,550 A | 12/1961 | Murchie |
| 3,608,739 A | 9/1971 | Duboff |
| 4,023,474 A | 5/1977 | Dixon |
| 4,334,482 A | 6/1982 | Bolduc |
| 4,433,671 A | 2/1984 | DeAmicis |
| 4,502,460 A | 3/1985 | Kelz |
| 4,548,193 A | 10/1985 | Marogil |
| 4,624,238 A | 11/1986 | Hait |
| 4,732,138 A | 3/1988 | Vos |
| 4,747,352 A | 5/1988 | Guidry et al. |
| 4,884,551 A | 12/1989 | Hait |
| 5,025,715 A | 6/1991 | Sir |
| 5,103,799 A | 4/1992 | Atanasio |
| 5,297,534 A | 3/1994 | Louden |
| 5,406,931 A | 4/1995 | Montgomery |
| 5,868,128 A | 2/1999 | Omar |
| 5,931,148 A | 8/1999 | Freeman |
| 5,967,075 A | 10/1999 | Johansen |
| 5,992,407 A | 11/1999 | Tsai |
| 6,386,192 B1 | 5/2002 | Weber |
| 6,463,946 B1 | 10/2002 | Wu |
| D471,035 S | 3/2003 | Schwanke et al. |
| 6,640,797 B1 | 11/2003 | Magers |
| 6,719,250 B2 | 4/2004 | FitzSimons |
| 6,886,788 B1 | 5/2005 | Chung |
| 6,895,958 B1 | 5/2005 | Komosky |
| 7,044,064 B2 | 5/2006 | Li |
| 7,063,006 B1 | 6/2006 | Spehle et al. |
| 7,124,694 B2 | 10/2006 | Li |
| 7,537,015 B1 | 5/2009 | Molnar, IV et al. |
| D596,892 S * | 7/2009 | Vanderminden ............... D6/686 |
| 7,984,679 B1 | 7/2011 | McFee |
| 8,166,870 B2 * | 5/2012 | Badin ................ A47J 37/0682 |
| | | 126/25 R |
| 8,291,840 B2 | 10/2012 | Baracchia |
| 2006/0075935 A1 | 4/2006 | Li |
| 2007/0062418 A1 | 3/2007 | Li |
| 2008/0134551 A1 | 6/2008 | Conforti et al. |
| 2009/0308286 A1 | 12/2009 | Bourbeau |
| 2011/0303124 A1 | 12/2011 | Tseng |
| 2012/0049033 A1 | 3/2012 | Mosley |
| 2013/0081609 A1 | 4/2013 | Dhuper et al. |
| 2013/0255659 A1 | 10/2013 | Fulp et al. |

FOREIGN PATENT DOCUMENTS

| | | |
|---|---|---|
| CN | 201067189 Y | 6/2008 |
| CN | 201557272 U | 8/2010 |
| EP | 051952 B1 | 1/1986 |
| WO | 2011026535 A2 | 3/2011 |
| WO | 2013104778 A1 | 7/2013 |

* cited by examiner

Detail "A"

Section A-A

FIRE PIT TABLE WITH LAZY SUSAN TABLETOP PORTION

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates a fire pit table. More particularly, the invention relates to a fire pit table provided with a rotatable tray assembly (i.e., a lazy susan tabletop portion).

2. Background

Conventional table and chair sets are known that comprise a plurality of chairs disposed around a fire pit table. These table and chair sets are typically used on an outdoor patio of a dwelling so that individuals can relax on the patio and have a conversation with one another. However, the fire pit table in the conventional table and chair set is typically only used for one purpose, namely to accommodate a fire within the table. The conventional fire pit table is not functionally well-suited for other purposes, such as dining. Because space is often limited on an outdoor patio of a typical residence, individuals normally do not want to have a separate table for dining, and then another table with a fire pit. Thus, the desirability of a conventional fire pit table is decreased by its limited functionality.

Therefore, what is needed is a multi-functional fire pit table that can be readily used for both relaxing around a fire, and for dining. Moreover, a fire pit table is needed that includes an integrated rotatable tray assembly (i.e., a lazy susan tabletop portion) that facilitates the transfer of food items among individuals seated around the table. Furthermore, a fire pit table is needed that can be easily converted between multiple modes of operation (e.g., operating as a fire pit table and a dining table) without requiring a user thereof to laboriously disassemble a portion of the table.

BRIEF SUMMARY OF EMBODIMENTS OF THE INVENTION

Accordingly, the present invention is directed to a fire pit table with a rotatable tray assembly (i.e., a lazy susan tabletop portion) that substantially obviates one or more problems resulting from the limitations and deficiencies of the related art.

In accordance with one or more embodiments of the present invention, there is provided a fire pit table with a rotatable tray assembly, which includes a base portion having a burner assembly and a storage compartment configured to hold a gas supply cylinder; a tabletop portion supported on the base portion, the tabletop portion having a central aperture disposed therethrough, the central aperture being circumscribed by an annular ledge portion of the tabletop portion; and a rotatable tray assembly configured to cover the central aperture of the tabletop portion. The rotatable tray assembly includes a base portion configured to be disposed on the annular ledge portion of the tabletop portion, the base portion including an inner annular base member and an outer annular base member; a tray support structure, the tray support structure coupled to the base portion of the rotatable tray assembly; and a tray top member, the tray top member supported by the tray support structure, the tray top member configured to rotate relative to the tabletop portion of the fire pit table.

In a further embodiment of the present invention, the base portion further comprises a fire bowl coupled to the burner assembly, the fire bowl being disposed within the central aperture of the tabletop portion.

In yet a further embodiment, the base portion further comprises a plurality of circumferentially spaced-apart vertical frame members and a plurality of radially-extending horizontal frame members coupled to respective ones of the plurality of circumferentially spaced-apart vertical frame members, the fire bowl being structurally supported by the plurality of circumferentially spaced-apart vertical frame members and the plurality of radially-extending horizontal frame members.

In still a further embodiment, the base portion further comprises an interior firewall housing member, the interior firewall housing member configured to separate the storage compartment, which is configured to hold the gas supply cylinder, from a remainder of an interior portion of the base portion.

In yet a further embodiment, the base portion further comprises a pivotable door for gaining access to the gas supply cylinder in the storage compartment of the base portion.

In still a further embodiment, the tabletop portion further comprises a downturned peripheral rim circumscribing the central aperture, the downturned peripheral rim being connected to the annular ledge portion of the tabletop portion.

In yet a further embodiment, the annular ledge portion of the tabletop portion further comprises an annular protrusion extending upwardly therefrom, the annular protrusion being disposed outwardly from the outer annular base member of the base portion of the rotatable tray portion, the annular protrusion configured to prevent the rotatable tray assembly from being displaced outside of the annular ledge portion of the tabletop portion In still a further embodiment, the outer annular base member of the base portion of the rotatable tray assembly rotates relative to the inner annular base member of the base portion of the rotatable tray assembly.

In yet a further embodiment, the outer annular base member of the base portion of the rotatable tray assembly is rotatably coupled to the inner annular base member of the base portion of the rotatable tray assembly by a ball bearing subassembly.

In still a further embodiment, the outer annular base member of the base portion of the rotatable tray assembly is fixedly secured to the tray top member of the rotatable tray assembly by a plurality of fastener members, and wherein the inner annular base member of the base portion of the rotatable tray assembly comprises a plurality of circumferentially spaced-apart support pads that are configured to rest against the annular ledge portion of the tabletop portion.

In yet a further embodiment, the tray support structure of the rotatable tray assembly comprises a plurality of spoke members extending radially outward from a central region of the tray support structure.

In still a further embodiment, the rotatable tray assembly is structurally supported only by the annular ledge portion of the tabletop portion.

In yet a further embodiment, when the burner assembly of the base portion is generating a fire within the central aperture of the tabletop portion, the rotatable tray assembly is configured to be removed from a remainder of the fire pit table.

In still a further embodiment, the rotatable tray assembly is configured to be removed from a remainder of the fire pit table without the use of tools.

In yet a further embodiment, the fire pit table is not for cooking food.

In accordance with one or more other embodiments of the present invention, there is provided a fire pit table with a rotatable tray assembly, which includes a base portion having a burner assembly, a fire bowl coupled to the burner assembly, and a storage compartment configured to hold a gas supply cylinder; a tabletop portion supported on the base portion, the tabletop portion having a central aperture disposed therethrough, the central aperture being circumscribed by an annular ledge portion of the tabletop portion, the fire bowl being disposed within the central aperture of the tabletop portion; and a rotatable tray assembly configured to cover the central aperture of the tabletop portion. The rotatable tray assembly includes a base portion configured to be disposed on the annular ledge portion of the tabletop portion, the base portion including an inner annular base member and an outer annular base member; a tray support structure, the tray support structure coupled to the base portion of the rotatable tray assembly; and a tray top member, the tray top member supported by the tray support structure, the tray top member configured to rotate relative to the tabletop portion of the fire pit table.

In a further embodiment of the present invention, the fire bowl is disposed above at least a portion of the storage compartment configured to hold the gas supply cylinder.

In yet a further embodiment, the base portion further comprises a plurality of circumferentially spaced-apart vertical frame members, a plurality of radially-extending horizontal frame members coupled to respective ones of the plurality of circumferentially spaced-apart vertical frame members, and a peripheral sidewall disposed between one or more of the plurality of circumferentially spaced-apart vertical frame members. The fire bowl is structurally supported by the plurality of circumferentially spaced-apart vertical frame members and the plurality of radially-extending horizontal frame members.

In still a further embodiment, the base portion further comprises a battery compartment for holding a battery that is used to power an igniter element of the burner assembly. The battery compartment comprises an access port disposed in the peripheral sidewall of the base portion for enabling a user to insert and remove the battery from the battery compartment.

In accordance with yet one or more other embodiments of the present invention, there is provided a fire pit table with a rotatable tray assembly, which includes a base portion including a burner assembly, a fire bowl coupled to the burner assembly, and a storage compartment configured to hold a gas supply cylinder; a tabletop portion supported on the base portion, the tabletop portion having a central aperture disposed therethrough, the central aperture being circumscribed by an annular ledge portion of the tabletop portion, the fire bowl being disposed within the central aperture of the tabletop portion; and a rotatable tray assembly configured to cover the central aperture of the tabletop portion, the rotatable tray assembly being configured to be removed from a remainder of the fire pit table without the use of tools. The rotatable tray assembly includes a base portion configured to be disposed on the annular ledge portion of the tabletop portion, the base portion including an inner annular base member and an outer annular base member; a tray support structure, the tray support structure coupled to the base portion of the rotatable tray assembly; and a tray top member, the tray top member supported by the tray support structure, the tray top member configured to rotate relative to the tabletop portion of the fire pit table. In these one or more other embodiments, the fire pit table is not for cooking food, and the rotatable tray assembly does not remain on the fire pit table when a flame is present in the fire bowl.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 3:
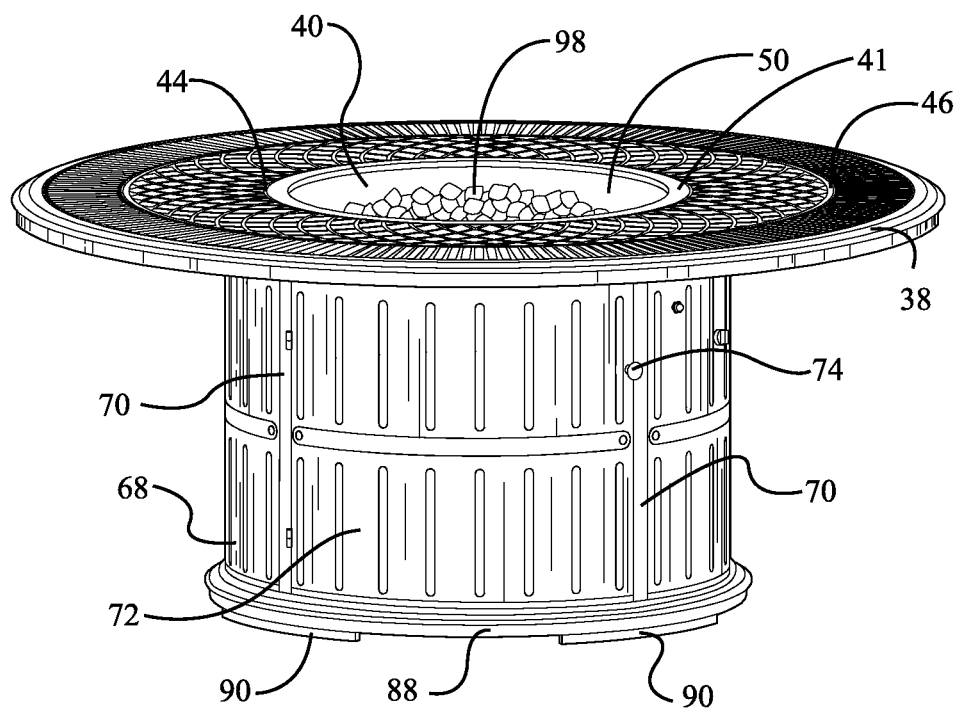
FIG. 3 is a perspective view of the fire pit table of FIG. 1, wherein the rotatable tray assembly has been removed from a remainder of the fire pit table in order to illustrate a fire bowl of the fire pit table.
Figure 4:
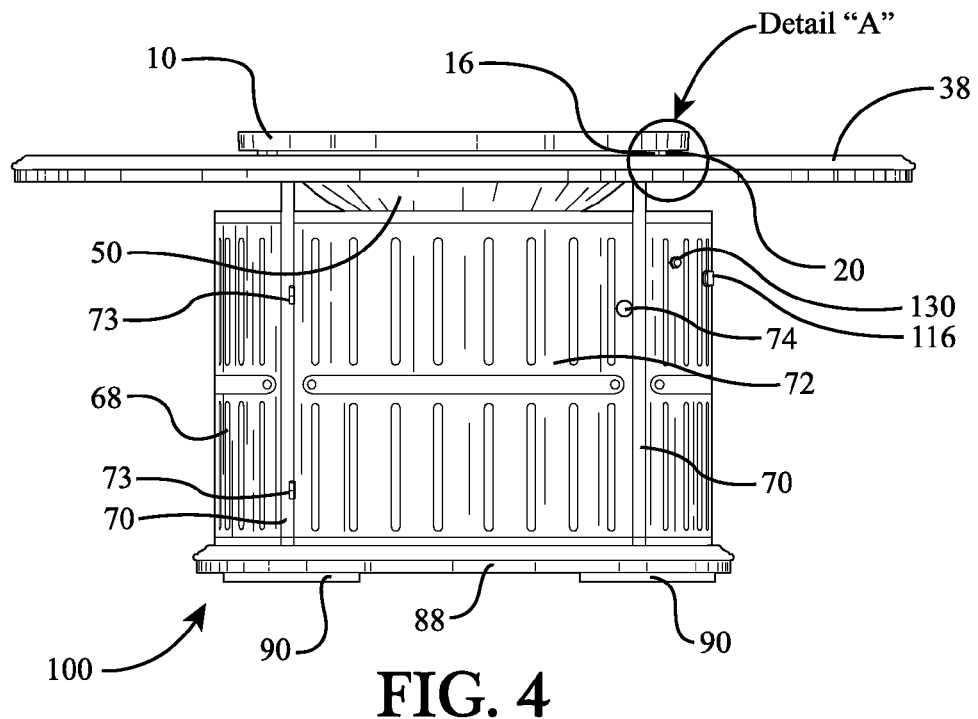
FIG. 4 is a side view of the fire pit table of FIG. 1, wherein the rotatable tray assembly is shown covering the fire bowl of the fire pit table.

An illustrative embodiment of a fire pit table 100 with a rotatable tray assembly (i.e., a lazy susan tabletop portion) is shown in FIGS. 1-18. Initially, referring to FIGS. 1, 4, 7, and 8, it can be seen that the fire pit table 100 generally comprises a base portion or main body portion 48, the base portion includes a burner assembly (see FIG. 16), a fire bowl 50 coupled to the burner assembly, and a storage compartment (see FIGS. 17 and 18) configured to hold a gas supply cylinder 140; a tabletop portion 38 supported on the base portion 48, the tabletop portion 38 having a central aperture 40 disposed therethrough, the central aperture 40 being circumscribed by an annular ledge portion 41 of the tabletop portion 38, the fire bowl 50 being disposed within the central aperture 40 of the tabletop portion 38; and a rotatable tray assembly 10 configured to cover the central aperture 40 of the tabletop portion 38. As best shown in FIGS. 10-14, the rotatable tray assembly generally includes a base portion 16, 20 configured to be disposed on the annular ledge portion 41 of the tabletop portion 38, the base portion including an inner annular base member 16 and an outer annular base member 20; a tray support structure 28, 30, the tray support structure 28, 30 coupled to the base portion 16, 20 of the rotatable tray assembly 10; and a tray top member 34, the tray top member 34 supported by the tray support structure 28, 30, the tray top member 34 configured to rotate relative to the tabletop portion 38 of the fire pit table 100. The fire pit table 100 of the illustrated embodiment is not for cooking food, but rather it is for creating a relaxing fire about which a plurality of individuals may sit. As shown in FIG. 3, the rotatable tray assembly 10 does not remain on the fire pit table 100 when the fire pit is being used (i.e., when a flame is present in the fire bowl 50). Rather, prior to using the fire pit of the fire pit table 100, the rotatable tray assembly 10 is removed from the remainder of the fire pit table 100 (e.g., it is placed off to the side of the table 100). That is, when the burner assembly of the base portion 48 is generating a fire within the central aperture 40 of the tabletop portion 38, the rotatable tray assembly 10 is removed from the remainder of the fire pit table 100. Advantageously, in the illustrative embodiment, the rotatable tray assembly 10 may be removed from the remainder of the fire pit table 100 without the use of tools (i.e., there are no fasteners or other devices that connect the rotatable tray assembly 10 to the annular ledge portion 41 of the tabletop portion 38). The rotatable tray assembly 10 merely rests on the top surface of the annular ledge portion 41 of the tabletop portion 38.

Figure 1:
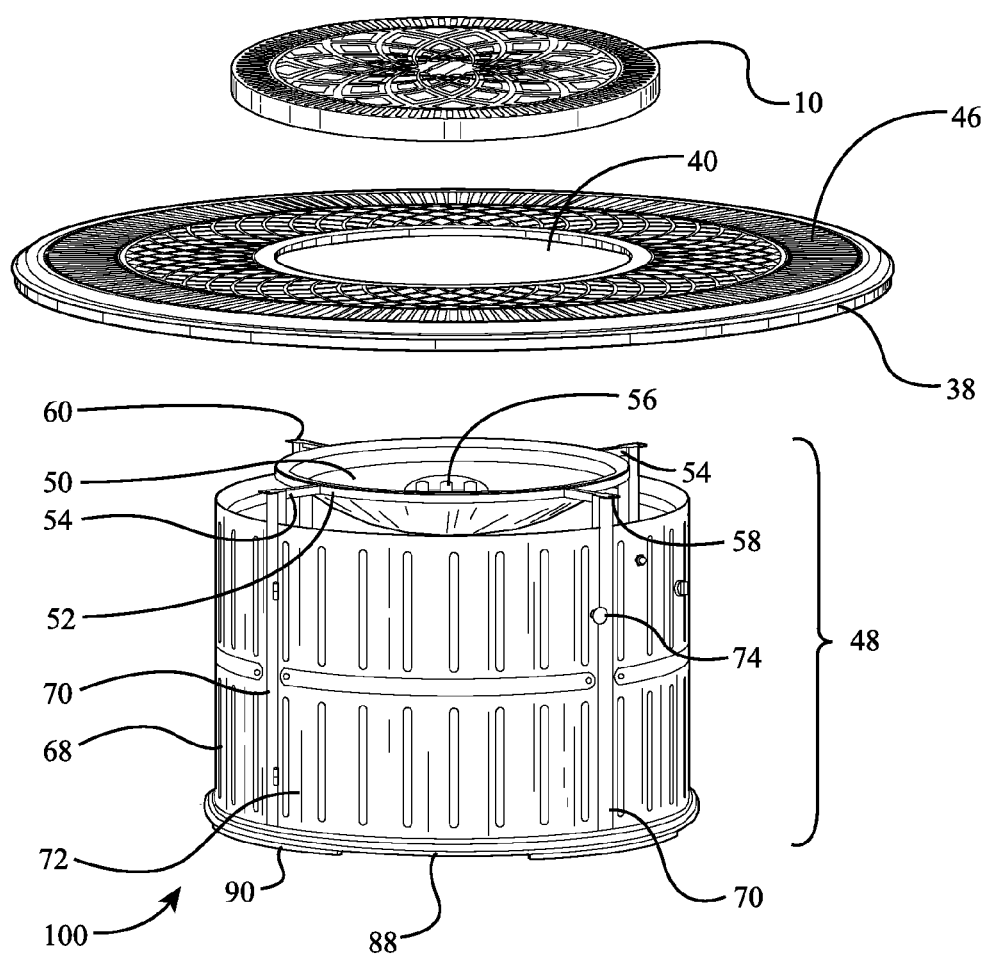
FIG. 1 is a partially exploded perspective view of the fire pit table with the rotatable tray assembly, according to an embodiment of the invention, wherein the rotatable tray assembly and the tabletop portion are shown exploded from the base portion of the fire pit table.
Figure 2:
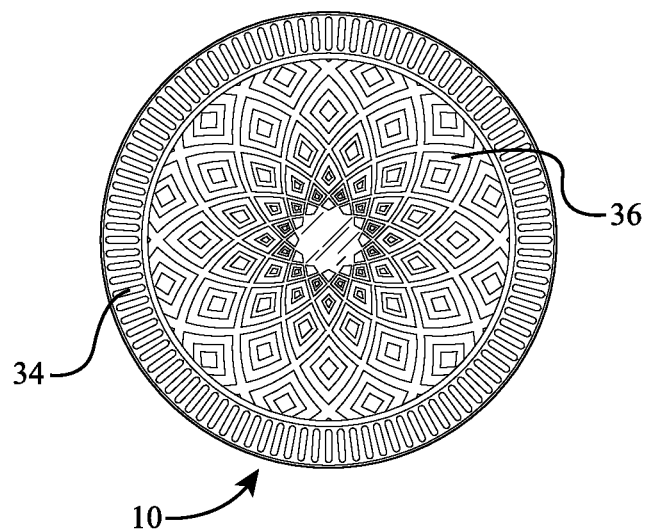
FIG. 2 is a top view of the rotatable tray assembly of the fire pit table of FIG. 1.
Figure 8:
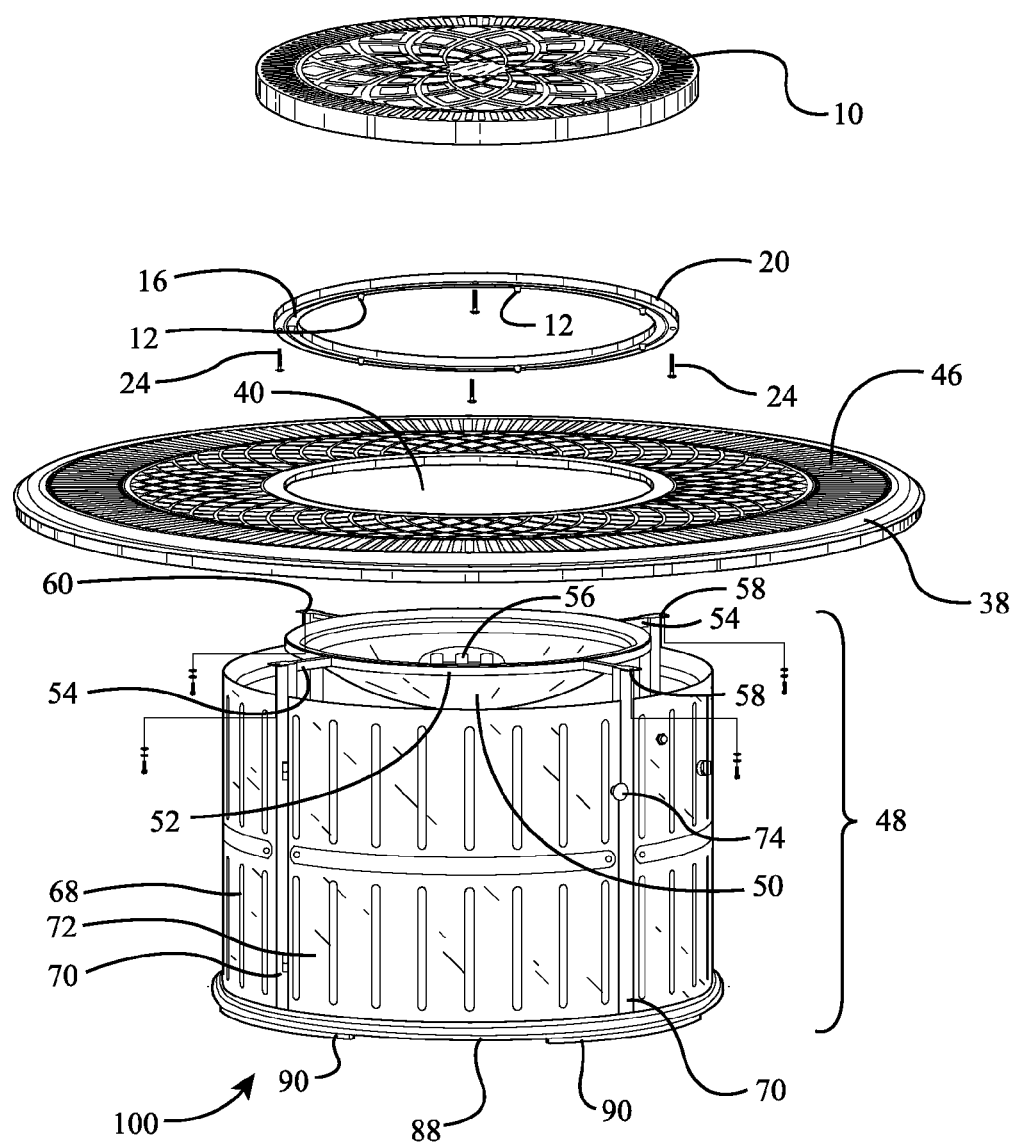
FIG. 8 is another partially exploded perspective view of the fire pit table of FIGS. 1 and 4, wherein the rotatable tray assembly and the tabletop portion are shown exploded from the base portion of the fire pit table, and wherein components of the rotatable tray assembly are shown exploded from one another.

Referring particularly to FIGS. 1, 8, 9, and 15-18, the features of the base portion 48 of the fire pit table 100 will be described in detail. Initially, as shown in FIGS. 1 and 8, it can be seen that, in addition to the burner assembly, fire bowl 50, and gas cylinder storage compartment mentioned above, the base portion 48 further includes a frame structure 52, 54, 58, 70. The frame structure of the fire pit table base portion 48 comprises a plurality of circumferentially spaced-apart vertical frame members 70 and a plurality of radially-extending horizontal frame members 54 coupled to respective ones of the plurality of circumferentially spaced-apart vertical frame members 70. As depicted in FIGS. 1 and 8, the fire bowl 50 is structurally supported by the plurality of circumferentially spaced-apart vertical frame members 70 and the plurality of radially-extending horizontal frame members 54. In particular, as best shown in the detail view of FIG. 5, it can be seen that a peripheral flange 50a of the fire bowl 50 is supported on circular frame member 52 (see FIG. 1) which, in turn, is structurally connected to the radially-extending horizontal frame members 54. As such, the circular frame member 52 forms a ring within which the fire bowl 50 is placed. Additionally, in FIGS. 1, 8, and 9, it can be seen that a mounting flange 58 is provided on a top surface of each of the four (4) radially-extending horizontal frame members 54. As illustrated in the exploded view of FIG. 9, each mounting flange 58 is provided with a fastener aperture 60 disposed therein for receiving a respective shaft of a tabletop fastener member 62 (i.e., screw 62). The tabletop portion 38 of the fire pit table 100 is secured to the base portion 48 by means of the four (4) tabletop fastener members 62 (i.e., screws) attaching the underside of the tabletop portion 38 to the mounting flanges 58. In order to prevent the inadvertent disengagement of the tabletop fastener members 62, each of the tabletop fastener members 62 is provided with a washer 64 and a locking washer 66 disposed on the respective shaft thereof.

Figure 9:
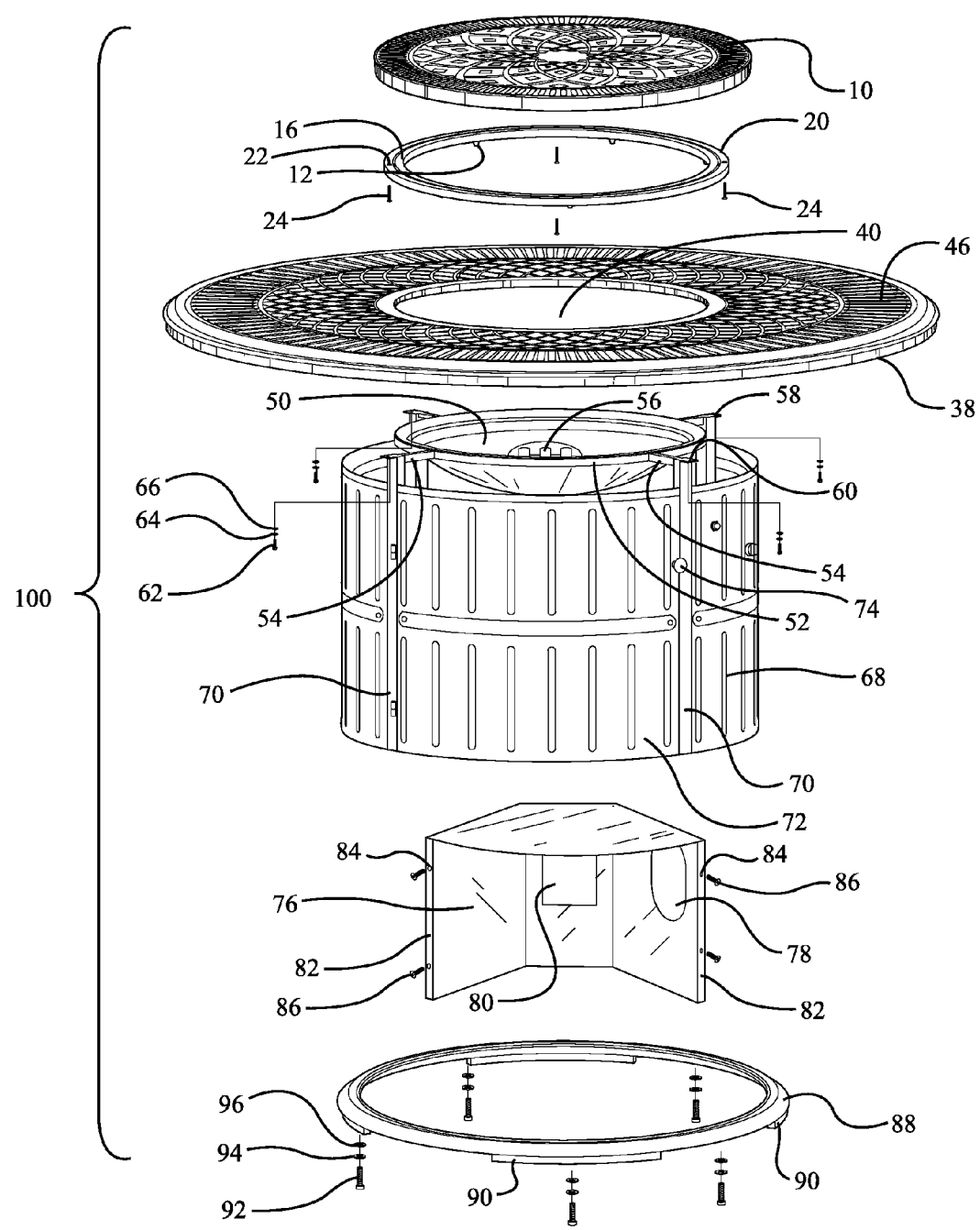
FIG. 9 is yet another partially exploded perspective view of the fire pit table of FIGS. 1 and 4, wherein the rotatable tray assembly and the tabletop portion are shown exploded from the base portion of the fire pit table, and wherein components of the rotatable tray assembly and the base portion are shown exploded from one another.
Figure 10:
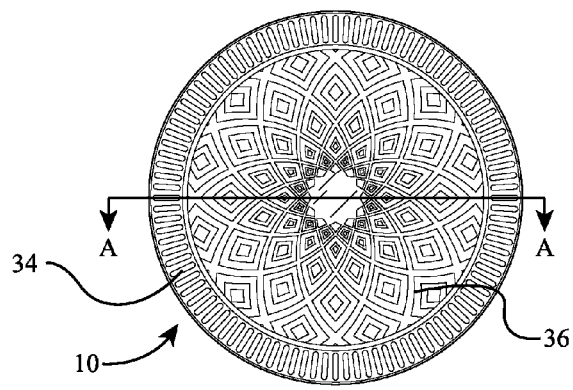
FIG. 10 is a top view of the rotatable tray assembly of the fire pit table of FIG. 1.
Figure 11:
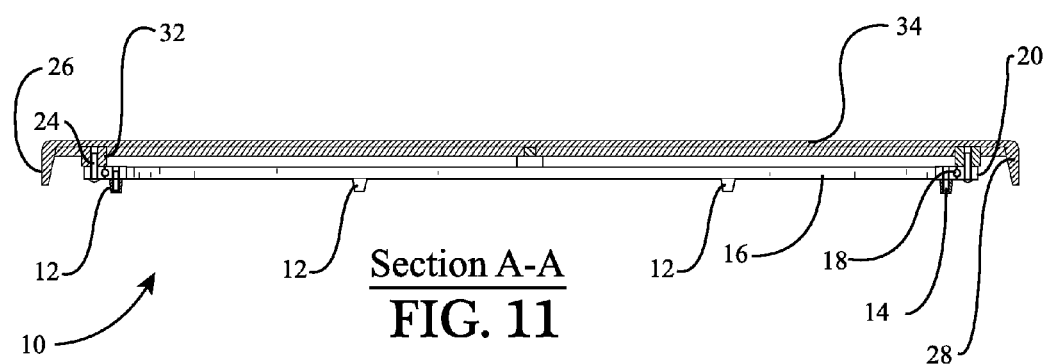
FIG. 11 is a partial sectional view of the rotatable tray assembly of the fire pit table of FIG. 1, wherein the section is generally cut along the cutting-plane line A-A in FIG. 10.

With reference again to FIGS. 1, 8, and 9, it can be seen that the base portion 48 also includes three (3) semi-circular peripheral sidewall members 68 disposed between the circumferentially spaced-apart vertical frame members 70 so as to enclose the base portion 48 of the fire pit table 100. In one or more embodiments, the semi-circular peripheral sidewall members 68 are affixed to the vertical frame members 70 by means of fasteners (e.g., screws). In order to gain access to the gas supply cylinder 140 in the storage compartment (see FIGS. 17 and 18) of the base portion 48, a semi-circular pivotable door 72 mounted on a pair of spaced-apart hinges 73 is provided between one pair of the vertical frame members 70. The semi-circular pivotable door 72 has generally the same curvature, or the same curvature as the semi-circular sidewall members 68 so that the base portion 48 has an overall generally cylindrical shape. As shown in FIGS. 1, 8, and 9, the semi-circular pivotable door 72 is provided with a mushroom-shaped door handle 74 disposed thereon to facilitate the easy opening of the pivotable door 72 by a user of the fire pit table 100.

Figure 17:
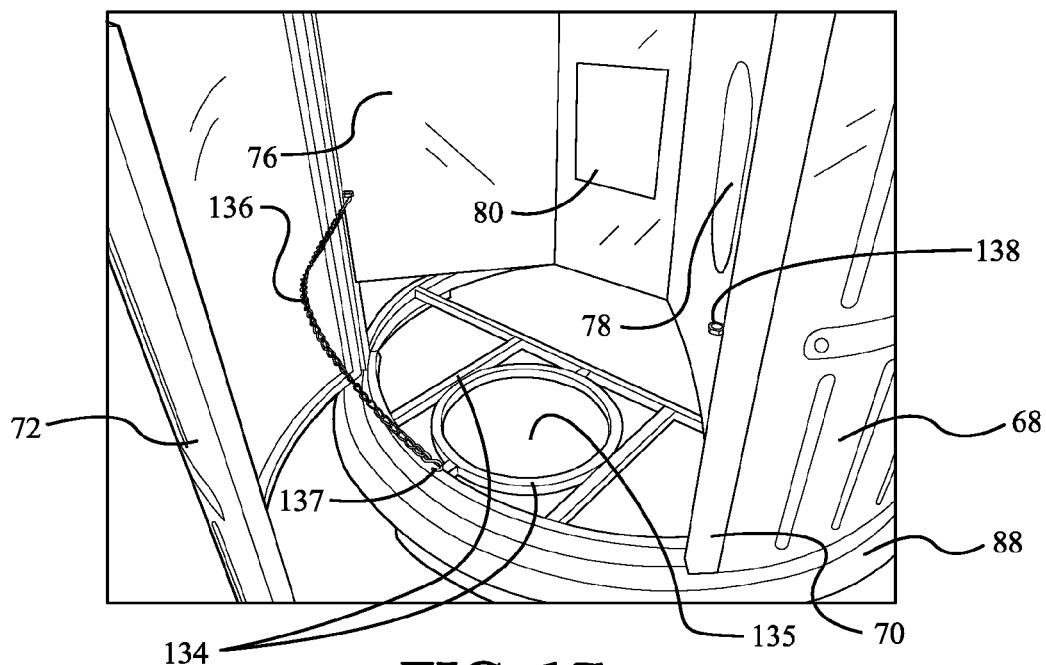
FIG. 17 is an enlarged perspective view of a gas cylinder storage compartment of the fire pit table of FIG. 1, wherein a door of the storage compartment is shown in an open position to illustrate the interior details of the storage compartment.
Figure 18:
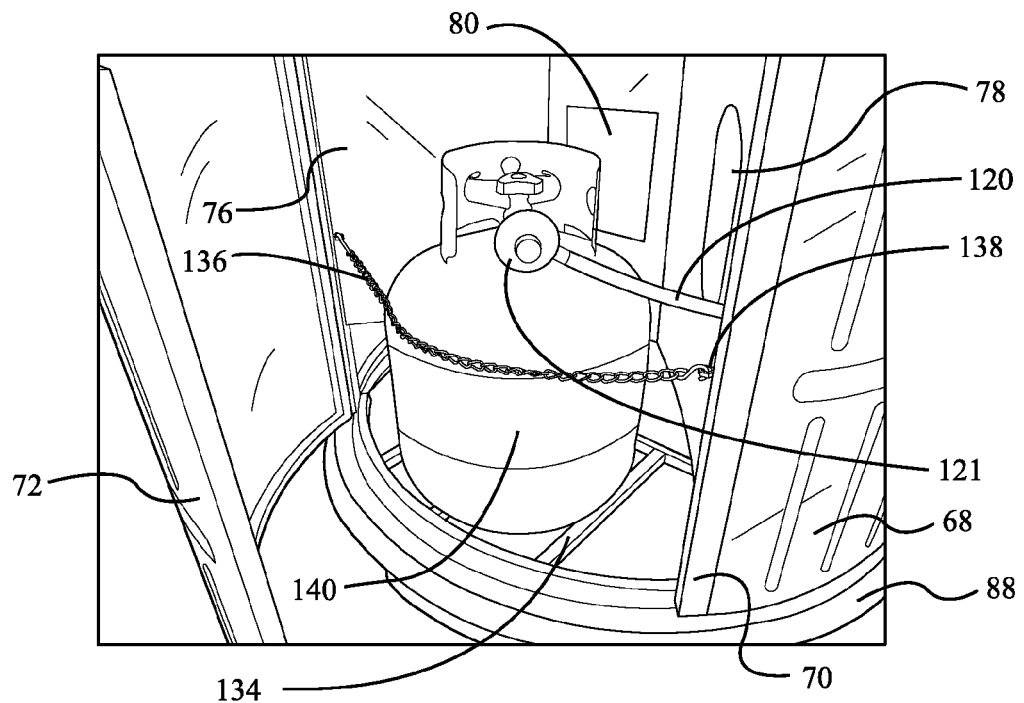
FIG. 18 is an enlarged perspective view of a gas cylinder storage compartment of the fire pit table of FIG. 1, wherein a door of the storage compartment is shown in an open position and a gas supply cylinder is shown connected to the gas supply train assembly of the fire pit table.

The gas cylinder storage compartment of the base portion 48 is best illustrated in FIGS. 17 and 18. Referring to these figures, it can be seen that the base portion 48 of the fire pit table 100 further includes an interior firewall housing member 76 that forms the back wall or rear wall of the storage compartment. The other bounding side wall of the storage compartment is formed by the pivotable door 72. The interior firewall housing member 76 separates the gas cylinder storage compartment from a remainder of an interior portion of the base portion 48. As best illustrated in FIGS. 9 and 17, the interior firewall housing member 76 comprises an oval-shaped aperture 78 and a rectangular aperture 80 disposed therein. In FIG. 18, it can be seen that the gas supply line 120 passes through the oval-shaped aperture 78 in the interior firewall housing member 76 before it connects to the gas supply cylinder 140. The interior firewall housing member 76 is provided with flange members 82 disposed on opposite sides thereof for enabling the interior firewall housing member 76 to be secured to a pair of the vertical frame members 70, which form the door frame for the pivotable door 72. As shown in the exploded view of FIG. 9, each of the flange members 82 is provided with a pair of spaced-apart apertures 84 for receiving respective fasteners 86 (e.g., screws 86) that secure the interior firewall housing member 76 to sides of the vertical frame members 70. Turning to FIG. 17, it can be seen that the bottom of the gas cylinder storage compartment is provided with a gas cylinder frame member 134, which includes a circular opening 135 for receiving the circular base of the gas supply cylinder 140 therein. With combined reference to FIGS. 17 and 18, it can be seen that, once the gas supply cylinder 140 is positioned within the storage compartment, and it has been connected to the gas supply line 120, the gas supply cylinder 140 is secured in place within the storage compartment by engaging the hook 137 at the end of the gas cylinder securement chain 136 to the attachment loop 138 disposed at the right edge of the door opening of pivotable door 72.

As shown in FIGS. 1, 3, 8, and 9, it can be seen that the base portion 48 of the fire pit table 100 also includes an annular base member 88 disposed at the bottom of the peripheral sidewall members 68 and the vertical frame members 70. In the illustrated embodiment, with reference to the exploded view of FIG. 9, it can be seen that the annular base member 88 is secured to the bottom of the base portion 48 by means of five (5) fastener members 92 (e.g., screws 92). In order to prevent the inadvertent disengagement of the base fastener members 92, each of the base fastener members 92 is provided with a washer 94 and a locking washer 96 disposed on the respective shaft thereof. In order to elevate the bottom of the annular base member 88 above the ground on which the fire pit table 100 rests, four (4) circumferentially spaced-apart foot members 90 are attached to the underside of the annular base member 88 (see e.g., FIG. 9).

Figure 15:
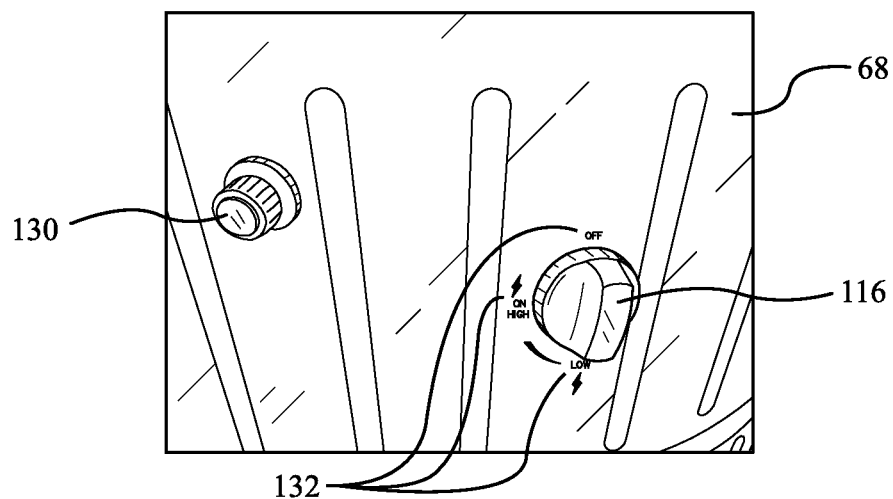
FIG. 15 is an enlarged perspective view of a sidewall portion of the fire pit table of FIG. 1, wherein the sidewall portion of the fire pit table comprises a removable battery compartment cap and a burner control knob.
Figure 16:
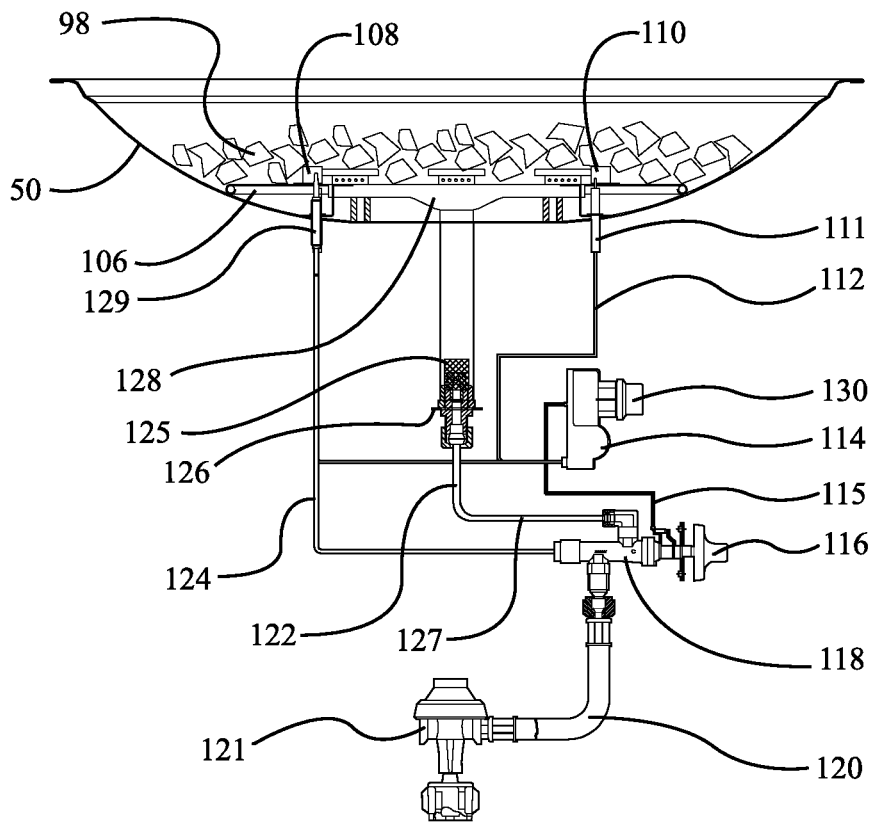
FIG. 16 is a diagrammatic side view of a gas burner and gas supply train assembly of the fire pit table of FIG. 1.

Now, with reference primarily to FIG. 16, the gas burner and gas supply train assembly of the fire pit table 100 will be described in detail. As shown in FIG. 16, the fire bowl 50 is provided with the gas burner 128 disposed therein for generating the flame of the fire pit table 100. The gas burner 128 is operatively coupled to the gas nozzle subassembly 122, which propels the liquefied petroleum (LP) gas into the gas burner 128 so the gas is able to mix with oxygen, and combustion is able to take place. The fire bowl 50 comprises a fire bowl vent 56 disposed in the side thereof to allow combustion air comprising oxygen to flow into the fire bowl 50 (see FIGS. 1, 8, and 9). In FIG. 16, it can be seen that the nozzle subassembly 122 comprises a nozzle member 125, a nozzle support bar 126 for supporting the nozzle member 125 within the base portion 48 of the fire pit table 100, and a nozzle gas supply line 127 that fluidly couples the nozzle member 125 to the gas control valve 118 with control knob 116. In addition to being fluidly coupled to the nozzle gas supply line 127, the gas control valve 118 is also operatively coupled to the ignition battery subassembly 114 by control wire 115, the thermocouple subassembly 124 with thermocouple element 129, and the gas supply line 120 (refer to FIG. 16). The gas supply line 120 is connected to the gas supply cylinder 140 (see FIG. 18) by means of the pressure regulator subassembly 121. As shown in FIG. 16, the ignition system of the gas burner assembly includes the ignition battery subassembly 114 for operating as the power source of the ignition system, an ignition wire 112 that electrically couples the battery of the ignition battery subassembly 114 to the igniter element 111 in the fire bowl 50, and the control wire 115 that connects to the gas control valve 118. The ignition battery subassembly 114 comprises a battery compartment for holding the battery that is used to power the igniter element 111 of the burner assembly. Turning to FIG. 15, it can be seen that the battery compartment of the ignition battery subassembly 114 comprises an access port (with a removable cap 130) disposed in the peripheral sidewall 68 of the base portion 48 for enabling a user to insert and remove the battery from the battery compartment. In an exemplary embodiment, the ignition battery subassembly 114 accommodates a AA-type battery for providing power to the igniter element 111. In the illustrative embodiment, the removable cap 130 of the battery compartment is provided with a plurality of internal threads disposed thereon that engages a plurality of corresponding external threads on the rim of the access port so that the cap 130 can be selectively removed and attached by a user of the fire pit table 100 (e.g., when the battery needs replaced, etc.).

Turning again to FIG. 16, it can be seen that the fire bowl 50 may be provided with cullet 98 (i.e., pieces of crushed or broken glass) or charcoal disposed therein, and supported on a an armor plate screen 106. Also, in FIG. 16, it can be seen that the thermocouple element 129 is provided with a first windshield 108 disposed therearound for protecting the thermocouple element 129 from interference caused by the wind. Similarly, the igniter element 111 is provided with a second windshield 110 disposed therearound for preventing wind from blowing out the ignition flame generated by the igniter element 111. As best shown in FIGS. 1, 8, and 9, the fire bowl 50 is disposed above at least a portion of the storage compartment that holds the gas supply cylinder 140.

Next, referring primarily to FIG. 15, the operation of the control knob 116 of the gas control valve 118 will be briefly described. In FIG. 15, it can be seen that the control knob 116 generally has the following three (3) operative positions 132: (i) an "off" setting, (ii) a "low" setting, and (iii) an "on high" setting. In order to ignite the flame of the fire pit table 100, a user first verifies that the control knob 116 is in the "off" position. Then, the user turns on the gas tank valve of the gas supply cylinder 140. Next, a user presses in, and turns the control knob 116 counterclockwise to the "high" setting to light. If the burner 128 is lit, the user retains the control knob 116 in a pressed-in position for approximately a minute so as to heat the thermocouple 129. When the control knob 116 is released by the user, the burner 128 should be lit. If the burner 128 is not lit, the user turns the control knob 116 clockwise to the "off" position, and then retries igniting the flame of the fire pit table 100 after waiting approximately five (5) minutes from the step of pressing in, and turning the control knob 116 counterclockwise to the "high" setting. Once the burner 128 is lit, the user presses in, and turns the control knob 116 to the desired heat input (i.e., a "high" or "low" setting).

Figure 12:
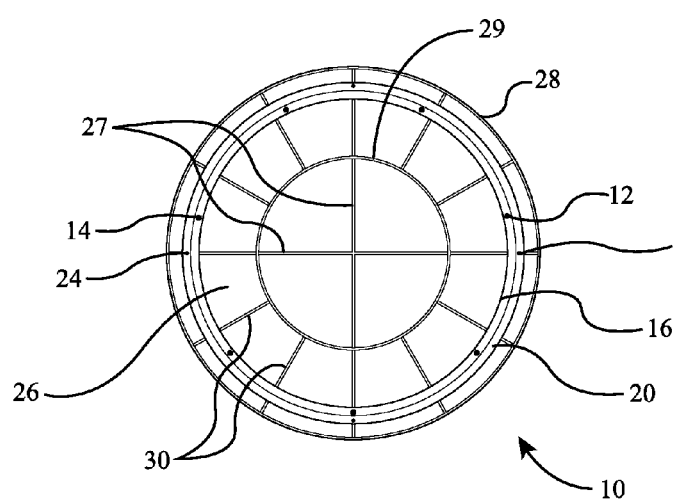
FIG. 12 is a bottom view of the rotatable tray assembly of the fire pit table of FIG. 1.
Figure 13:
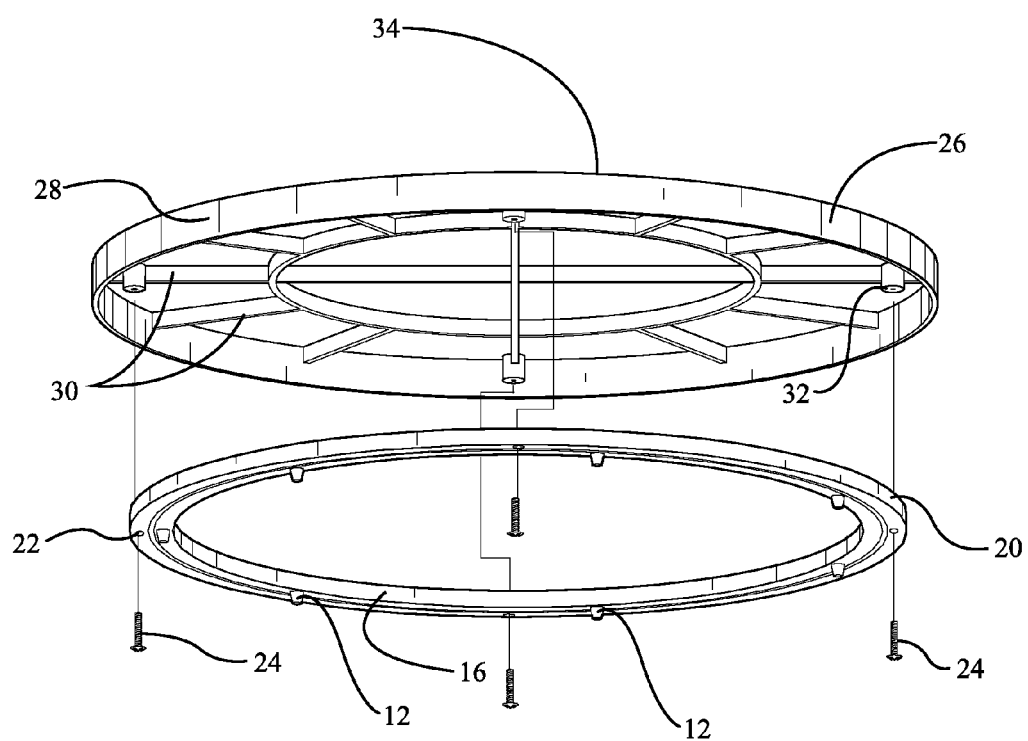
FIG. 13 is a partially exploded perspective view of the rotatable tray assembly of the fire pit table of FIG. 1.
Figure 14:
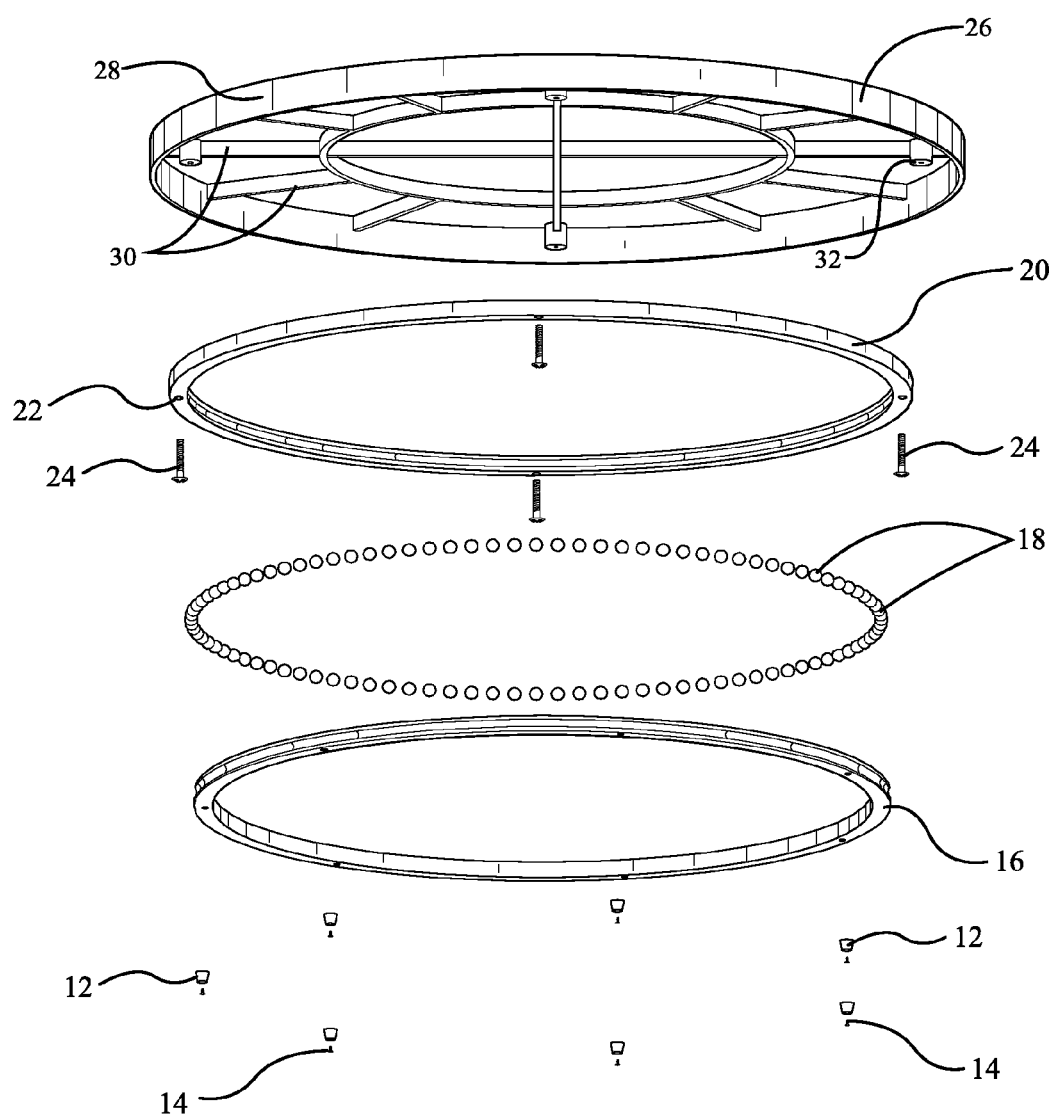
FIG. 14 is an exploded perspective view of the rotatable tray assembly of the fire pit table of FIG. 1.

Now, with reference to FIGS. 8-14, the rotatable tray assembly 10 of the fire pit table 100 will be explained in detail. As mentioned above, the rotatable tray assembly 10 generally includes an inner annular base member 16, an outer annular base member 20, a tray support structure 28, 30 coupled to the inner and outer annular base members 16, 20 of the rotatable tray assembly 10, and a tray top member 34 supported by the tray support structure 28, 30. In FIG. 14, it can be seen that the outer annular base member 20 of the base portion 16, 20 of the rotatable tray assembly 10 is rotatably coupled to the inner annular base member 16 by a ball bearing subassembly comprising a plurality of balls 18 disposed between races of the inner and outer annular base members 16, 20. By virtue of the ball bearing subassembly, the outer annular base member 20 of the rotatable tray assembly 10 rotates relative to the inner annular base member 16 of the rotatable tray assembly 10. As shown in FIG. 13, it can be seen that the outer annular base member 20 of the rotatable tray assembly 10 is fixedly secured to the tray top member 34 of the rotatable tray assembly 10 by a plurality of fastener members 24 (e.g., four (4) screws 24). In particular, the outer annular base member 20 is provided with a plurality of fastener apertures 22, each of which corresponds to a fastener member 24. The fastener members 24 pass through their respective fastener apertures 22 in the outer annular base member 20, and are threadingly engaged with respective fastener bosses 32 of the rotatable tray tabletop and support frame 26 (see FIG. 14) so as to secure the outer annular base member 20 to the rotatable tray tabletop and support frame 26. As shown in FIG. 12, the rotatable tray tabletop and support frame 26 comprises the intersecting frame members 27, the outer annular frame member 28, the inner annular frame member 29, the spoke frame members 30, and the solid tabletop portion 34. The intersecting frame members 27 extend the full diameter of the tabletop portion 34 and are disposed approximately perpendicular, or perpendicular to one another. The plurality of circumferentially spaced-apart spoke frame members 30 extend radially outward from the centrally disposed inner annular frame member 29 to the outer annular frame member 28. The outer annular frame member 28 circumscribes the peripheral outer edge of the tabletop portion 34 of the rotatable tray assembly 10, and is disposed generally concentrically, or concentrically with respect to the inner annular frame member 29. In the illustrated embodiment, the tray support structure 27, 28, 29, 30 is formed integrally with the solid tabletop portion 34 as a single unit (e.g., one-piece construction, wherein the tray support structure 27, 28, 29, 30 is molded as a single unit with tabletop portion 34). Although, in one or more alternative embodiments, the tray support structure 27, 28, 29, 30 may be formed separately from the tabletop portion 34, and then subsequently attached to the tabletop portion 34.

Referring to FIGS. 11-14, it can be seen that the inner annular base member 16 of the rotatable tray assembly 10 comprises a plurality of circumferentially spaced-apart support pads 12 that rest against the annular ledge portion 41 of the tabletop portion 38. As shown in FIG. 14, each of the support pads 12 is secured to the bottom surface of the inner annular base member 16 by means of a respective fastener 14 (i.e., a respective screw 14). In an exemplary embodiment, each of the support pads 12 may be formed from a resilient polymeric material, such as a semi-hard rubber material. In the illustrated embodiment, as best shown in the detail view of FIG. 5, the rotatable tray assembly 10 is structurally supported only by the annular ledge portion 41 of the tabletop portion 38 (i.e., the support pads 12 of the inner annular base member 16 rest on the annular ledge portion 41 of the tabletop portion 38.

Figure 5:
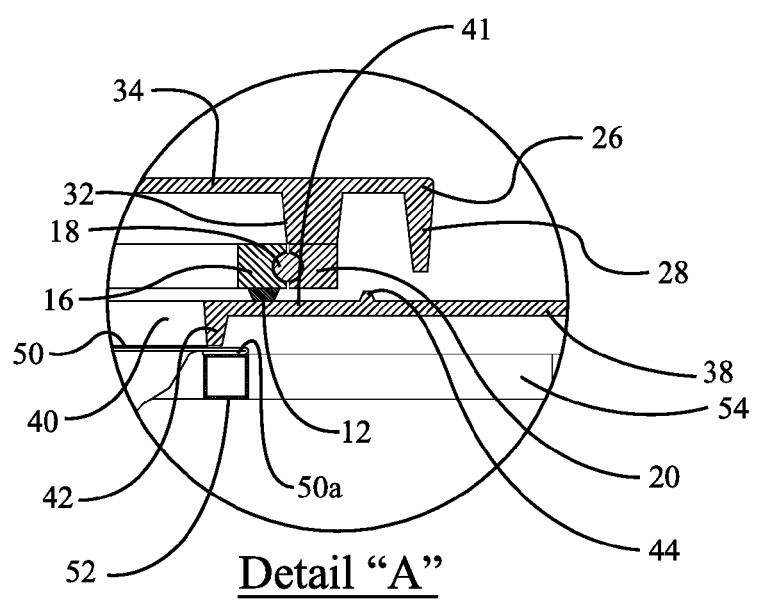
FIG. 5 is an enlarged side view of the engagement between the rotatable tray assembly and tabletop portion of the fire pit table in FIG. 4 (Detail "A")
Figure 6:
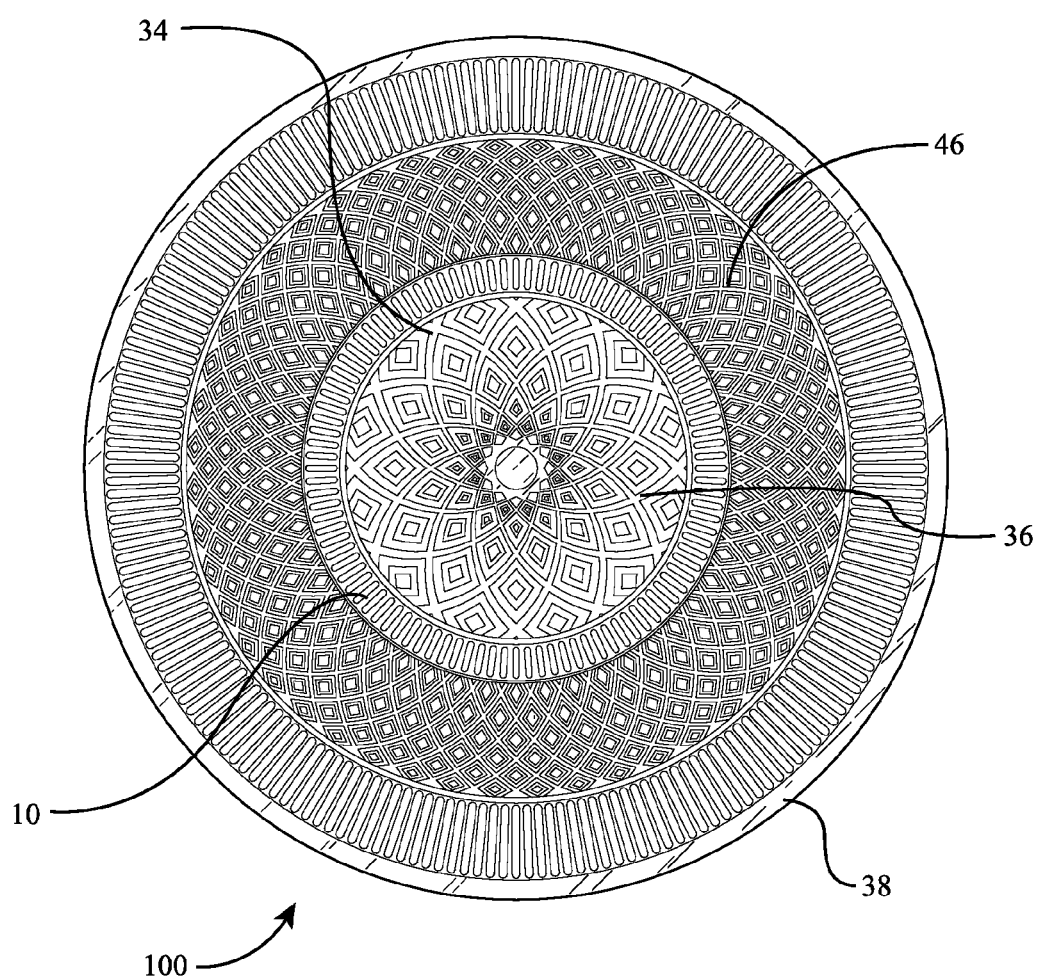
FIG. 6 is a top view of the fire pit table of FIGS. 1 and 4.

In FIG. 5, it can be seen that the tabletop portion 38 further comprises a downturned peripheral rim 42 circumscribing the central aperture 40 of the tabletop portion 38. The downturned peripheral rim 42 is connected to the annular ledge portion 41 of the tabletop portion 38. In one or more embodiments, the downturned peripheral rim 42 may be integrally formed with the annular ledge portion 41 of the tabletop portion 38. In FIG. 5, it can be seen that the bottom surface of the downturned peripheral rim 42 rests against, and abuts the top surface of the peripheral flange 50a of the fire bowl 50. Also, as shown in FIGS. 3 and 5, the annular ledge portion 41 of the tabletop portion 38 further comprises an annular protrusion 44 extending upwardly therefrom. The annular protrusion 44 has a generally trapezoidal cross-section, it forms a bounding wall that separates the annular ledge portion 41 of the tabletop portion 38 from the remainder of the tabletop portion 38 that is disposed outwardly from the annular protrusion 44. In FIG. 5, it can be seen that the annular protrusion 44 is disposed outwardly from the outer annular base member 20 of the rotatable tray portion 10. The annular protrusion 44 prevents the rotatable tray assembly 10 from being displaced outside of the annular ledge portion 41 of the tabletop portion 38 (i.e., it prevents the rotatable tray assembly 10 from sliding outside of the annular ledge portion 41 of the tabletop portion 38 so that it remains generally centered on the tabletop portion 38).

As shown in FIGS. 1, 3, and 6-9, the tabletop portion 38 of the fire pit table 100 may comprise a decorative pattern 46 formed in the top surface thereof to enhance the aesthetics of the table 100. Similarly, the solid tabletop portion 34 of the rotatable tray assembly 10 may include a decorative pattern 36 formed in the top surface thereof to further enhance the aesthetics of the table 100. The decorative pattern 36 of the tabletop portion 34 of the rotatable tray assembly 10 may generally match the decorative pattern 46 of the tabletop portion 38 (refer to FIGS. 1, 2, and 6-10).

Figure 7:
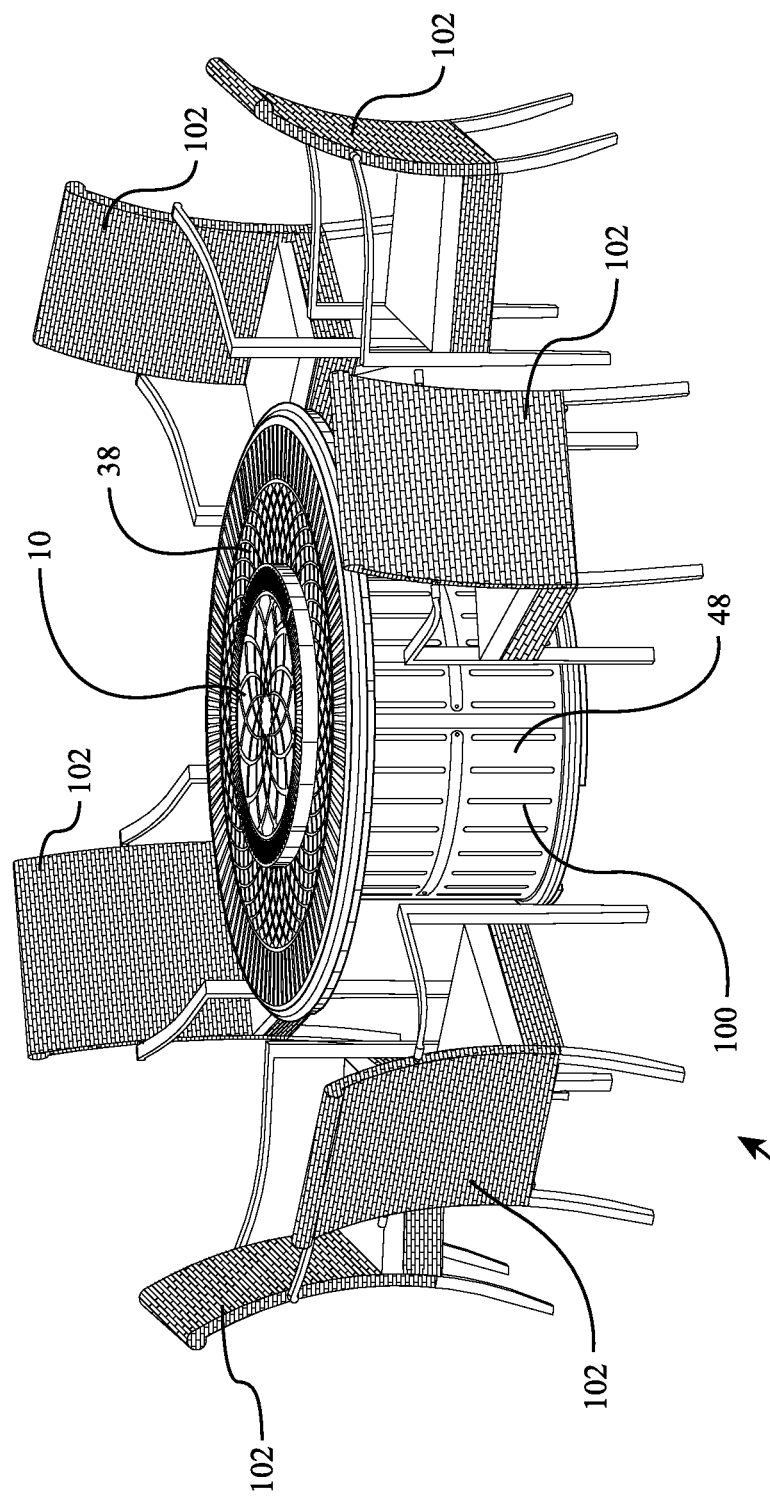
FIG. 7 is a perspective view of a table and chair set comprising the fire pit table of FIGS. 1 and 4.

Now, referring to FIG. 7, it can be seen that the fire pit table 100 described herein may be provided in conjunction with a table and chair set 104 (e.g., in the form of a chat set). In addition to the fire pit table 100, the table and chair set 104 of FIG. 7 comprises a plurality of chairs 102 (e.g., six (6) chairs 102) disposed around the table 100. Advantageously, the table and chair set 104 of FIG. 7 is multi-functional in use. For example, when the fire pit is active, and the rotatable tray assembly 10 is removed from the fire pit table 100, the table and chair set 104 may be used for entertainment and/or conversing. In contrast, when the fire pit is inactive, and the rotatable tray assembly 10 is disposed on the fire pit table 100, the table and chair set 104 may be used for dining (i.e., eating a meal thereon).

It is readily apparent that the aforedescribed fire pit table 100, which is provided with a rotatable tray assembly 10 (i.e., a lazy susan tabletop portion), offers numerous advantages. First, as described above, the fire pit table 100 is a multi-functional table such that it can be readily used for both relaxing around a fire, and for dining. Secondly, the fire pit table 100 includes an integrated rotatable tray assembly 10 (i.e., a lazy susan tabletop portion) that facilitates the transfer of food items among individuals seated around the table. Finally, the fire pit table can be easily converted between multiple modes of operation (e.g., operating as a fire table and a dining table) without requiring a user thereof to laboriously dissemble a portion of the table 100.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A fire pit table with a rotatable tray assembly, said fire pit table comprising:
   a table base portion including a burner assembly and a storage compartment configured to hold a gas supply cylinder;
   a tabletop portion supported on said table base portion, said tabletop portion having a central aperture disposed therethrough, said central aperture being circumscribed by an annular ledge portion of said tabletop portion; and
   a rotatable tray assembly configured to cover said central aperture of said tabletop portion, said rotatable tray assembly including:
      a tray base portion configured to be disposed on said annular ledge portion of said tabletop portion, said tray base portion including an inner annular base member and an outer annular base member, said outer annular base member of said tray base portion of said rotatable tray assembly being configured to rotate relative to said inner annular base member of said tray base portion of said rotatable tray assembly;
      a tray support structure, said tray support structure coupled to said tray base portion of said rotatable tray assembly; and
      a tray top member, said tray top member supported by said tray support structure, said tray top member configured to rotate relative to said tabletop portion of said fire pit table;
   wherein said outer annular base member of said tray base portion of said rotatable tray assembly is fixedly secured to said tray top member of said rotatable tray assembly by a plurality of fastener members, and wherein said inner annular base member of said tray base portion of said rotatable tray assembly comprises a plurality of circumferentially spaced-apart support pads that are configured to rest against said annular ledge portion of said tabletop portion.

2. The fire pit table according to claim 1, wherein said table base portion further comprises a fire bowl coupled to said burner assembly, said fire bowl being disposed within said central aperture of said tabletop portion.

3. The fire pit table according to claim 2, wherein said table base portion further comprises a plurality of circumferentially spaced-apart vertical frame members and a plurality of radially-extending horizontal frame members coupled to respective ones of said plurality of circumferentially spaced-apart vertical frame members, said fire bowl being structurally supported by said plurality of circumferentially spaced-apart vertical frame members and said plurality of radially-extending horizontal frame members.

4. The fire pit table according to claim 1, wherein said table base portion further comprises an interior firewall housing member, said interior firewall housing member configured to separate said storage compartment, which is configured to hold said gas supply cylinder, from a remainder of an interior portion of said table base portion.

5. The fire pit table according to claim 1, wherein said table base portion further comprises a pivotable door for gaining access to said gas supply cylinder in said storage compartment of said table base portion.

6. The fire pit table according to claim 1, wherein said tabletop portion further comprises a downturned peripheral rim circumscribing said central aperture, said downturned peripheral rim being connected to said annular ledge portion of said tabletop portion.

7. The fire pit table according to claim 1, wherein said annular ledge portion of said tabletop portion further comprises an annular protrusion extending upwardly therefrom, said annular protrusion being disposed outwardly from said outer annular base member of said tray base portion of said rotatable tray assembly, said annular protrusion configured to prevent said rotatable tray assembly from being displaced outside of said annular ledge portion of said tabletop portion.

8. The fire pit table according to claim 1, wherein said outer annular base member of said tray base portion of said rotatable tray assembly is rotatably coupled to said inner annular base member of said tray base portion of said rotatable tray assembly by a ball bearing subassembly.

9. The fire pit table according to claim 1, wherein said tray support structure of said rotatable tray assembly comprises a plurality of spoke members extending radially outward from a central region of said tray support structure.

10. The fire pit table according to claim 1, wherein said rotatable tray assembly is structurally supported only by said annular ledge portion of said tabletop portion.

11. The fire pit table according to claim 1, wherein, when said burner assembly of said table base portion is generating a fire within said central aperture of said tabletop portion, said rotatable tray assembly is configured to be removed from a remainder of said fire pit table.

12. The fire pit table according to claim 11, wherein said rotatable tray assembly is configured to be removed from a remainder of said fire pit table without the use of tools.

13. A fire pit table with a rotatable tray assembly, said fire pit table comprising:
   a table base portion including a burner assembly, a fire bowl coupled to said burner assembly, and a storage compartment configured to hold a gas supply cylinder;
   a tabletop portion supported on said table base portion, said tabletop portion having a tabletop surface and a central aperture disposed therethrough, said central aperture being circumscribed by an annular ledge portion of said tabletop portion, said fire bowl being disposed within said central aperture of said tabletop portion, said tabletop portion further including a downturned peripheral rim circumscribing said central aperture, said annular ledge portion of said tabletop portion being connected to a top portion of said downturned peripheral rim, and said annular ledge portion of said tabletop portion being disposed outwardly from said downturned peripheral rim; and
   a rotatable tray assembly configured to cover said central aperture of said tabletop portion, said rotatable tray assembly including:
      a tray base portion configured to be disposed on said annular ledge portion of said tabletop portion, said tray base portion including an inner annular base member and an outer annular base member;

a tray support structure, said tray support structure coupled to said tray base portion of said rotatable tray assembly; and a tray top member, said tray top member supported by said tray support structure, said tray top member configured to rotate relative to said tabletop portion of said fire pit table, and said tray top member sized to overlap and cover said annular ledge portion of said tabletop portion.

14. The fire pit table according to claim 13, wherein said fire bowl is disposed above at least a portion of said storage compartment configured to hold said gas supply cylinder.

15. The fire pit table according to claim 13, wherein said table base portion further comprises a plurality of circumferentially spaced-apart vertical frame members, a plurality of radially-extending horizontal frame members coupled to respective upper ends of said plurality of circumferentially spaced-apart vertical frame members, and a peripheral sidewall disposed between one or more of said plurality of circumferentially spaced-apart vertical frame members; wherein said plurality of radially-extending horizontal frame members extend inwardly towards a center of said table base portion from said upper ends of said plurality of circumferentially spaced-apart vertical frame members; and wherein said fire bowl is structurally supported by said plurality of circumferentially spaced-apart vertical frame members and said plurality of radially-extending horizontal frame members.

16. The fire pit table according to claim 15, wherein said table base portion further comprises a battery compartment holding a battery that is used to power an igniter element of said burner assembly; and wherein said battery compartment comprises an access port disposed in said peripheral sidewall of said table base portion for enabling a user to insert and remove said battery from said battery compartment.

17. The fire pit table according to claim 13, wherein said annular ledge portion of said tabletop portion further comprises an annular protrusion extending upwardly from said tabletop surface, said annular protrusion being disposed outwardly from said outer annular base member of said tray base portion of said rotatable tray assembly, said annular protrusion configured to prevent said rotatable tray assembly from being displaced outside of said annular ledge portion of said tabletop portion, and said tray top member sized to overlap and cover said annular protrusion of said annular ledge portion.

18. A fire pit table with a rotatable tray assembly, said fire pit table comprising:

a table base portion including a burner assembly, a fire bowl coupled to said burner assembly, a frame structure including an circular frame member, and a storage compartment configured to hold a gas supply cylinder, said fire bowl having a peripheral flange supported on said circular frame member;

a tabletop portion supported on said table base portion, said tabletop portion having a central aperture disposed therethrough, said central aperture being circumscribed by an annular ledge portion of said tabletop portion, said fire bowl being disposed within said central aperture of said tabletop portion, said tabletop portion further including a downturned peripheral rim circumscribing said central aperture, said downturned peripheral rim of said tabletop portion being disposed on said peripheral flange of said fire bowl; and a rotatable tray assembly configured to cover said central aperture of said tabletop portion, said rotatable tray assembly being configured to be removed from a remainder of said fire pit table without the use of tools, said rotatable tray assembly including:
 a tray base portion configured to be disposed on said annular ledge portion of said tabletop portion, said tray base portion including an inner annular base member and an outer annular base member;
 a tray support structure, said tray support structure coupled to said tray base portion of said rotatable tray assembly; and
 a tray top member, said tray top member supported by said tray support structure, said tray top member configured to rotate relative to said tabletop portion of said fire pit table;

wherein said rotatable tray assembly does not remain on said fire pit table when a flame is present in said fire bowl.

19. The fire pit table according to claim 18, wherein said frame structure of said table base portion further comprises a plurality of circumferentially spaced-apart vertical frame members and a plurality of radially-extending horizontal frame members coupled to respective ones of said plurality of circumferentially spaced-apart vertical frame members, said radially-extending horizontal frame members being coupled to said circular frame member such that said fire bowl is structurally supported by said plurality of radially-extending horizontal frame members and said plurality of circumferentially spaced-apart vertical frame members.

20. The fire pit table according to claim 19, wherein said table base portion further comprises a peripheral sidewall formed by a plurality of peripheral sidewall members, said plurality of peripheral sidewall members coupled to, and extending between said circumferentially spaced-apart vertical frame members.

* * * * *